US010629928B2

(12) United States Patent
Imanishi et al.

(10) Patent No.: US 10,629,928 B2
(45) Date of Patent: Apr. 21, 2020

(54) FUEL CELL SYSTEM AND CONTROL METHOD OF FUEL CELL SYSTEM

(71) Applicant: TOYOTA JIDOSHA KABUSHIKI KAISHA, Toyota-shi, Aichi-ken (JP)

(72) Inventors: Hiroyuki Imanishi, Toyota (JP); Tomio Yamanaka, Nagoya (JP); Masashi Toida, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 183 days.

(21) Appl. No.: 15/819,390

(22) Filed: Nov. 21, 2017

(65) Prior Publication Data

US 2018/0166716 A1 Jun. 14, 2018

(30) Foreign Application Priority Data

Dec. 8, 2016 (JP) .................................. 2016-238621

(51) Int. Cl.
| | |
|---|---|
| H01M 8/04298 | (2016.01) |
| H01M 8/04082 | (2016.01) |
| H01M 8/04313 | (2016.01) |
| H01M 8/04746 | (2016.01) |
| H01M 8/04089 | (2016.01) |
| H01M 8/04664 | (2016.01) |
| H01M 8/0438 | (2016.01) |
| H01M 8/04223 | (2016.01) |
| H01M 8/04302 | (2016.01) |

(52) U.S. Cl.
CPC ... *H01M 8/04298* (2013.01); *H01M 8/04082* (2013.01); *H01M 8/04097* (2013.01); *H01M 8/04313* (2013.01); *H01M 8/04402* (2013.01); *H01M 8/04664* (2013.01); *H01M 8/04753* (2013.01); *H01M 8/04761* (2013.01); *H01M 8/04268* (2013.01); *H01M 8/04302* (2016.02)

(58) Field of Classification Search
None
See application file for complete search history.

(56) References Cited

U.S. PATENT DOCUMENTS

2007/0218327 A1   9/2007   Ishikawa et al.

FOREIGN PATENT DOCUMENTS

| JP | 2004-172027 | 6/2004 |
| JP | 2004-281237 | 10/2004 |
| JP | 2005-235635 A | 9/2005 |
| JP | 2005235635 A * | 9/2005 |

(Continued)

*Primary Examiner* — Daniel S Gatewood
(74) *Attorney, Agent, or Firm* — Finnegan, Henderson, Farabow, Garrett & Dunner, LLP

(57) ABSTRACT

A fuel cell system includes a fuel cell, an oxidizing gas supplier, an oxidizing gas supply pipe, an oxidizing gas discharge pipe, a fuel gas supply pipe, a fuel gas return pipe, a fuel gas discharge valve, and a controller. The controller executes valve closing control to close the fuel gas discharge valve; and determines the flow rate of a diluent gas to be supplied to an oxidizing gas supply portion by the oxidizing gas supplier according to the flow rate of a leakage gas flowing from the fuel gas discharge valve to the oxidizing gas discharge pipe after the execution of the valve closing control. The flow rate of the diluent gas to be supplied to the oxidizing gas supply portion is determined to increase as the flow rate of the leakage gas increases.

10 Claims, 8 Drawing Sheets

(56) References Cited

FOREIGN PATENT DOCUMENTS

| | | | | |
|---|---|---|---|---|
| JP | 2013-246984 | A | | 12/2013 |
| JP | 2013246984 | A | * | 12/2013 |
| WO | WO 2005/119823 | A1 | | 12/2005 |

* cited by examiner

FUEL CELL SYSTEM AND CONTROL METHOD OF FUEL CELL SYSTEM

INCORPORATION BY REFERENCE

The disclosure of Japanese Patent Application No. 2016-238621 filed on Dec. 8, 2016 including the specification, drawings and abstract is incorporated herein by reference in its entirety.

BACKGROUND

1. Technical Field

The disclosure relates to a fuel cell system and a control method of a fuel cell system.

2. Description of Related Art

A fuel cell system having a fuel gas circulation path through which a discharge fuel gas discharged from an anode of a fuel cell is re-supplied to the anode of the fuel cell is known. In this type of fuel cell system, in order to periodically discharge impurities, such as moisture and nitrogen gas, contained in the discharge fuel gas flowing through the fuel gas circulation path to the outside of the fuel gas circulation path, for example, to an oxidizing gas exhaust pipe, a fuel gas discharge valve is provided between the fuel gas circulation path and the oxidizing gas exhaust pipe. When a problem occurs in the opening and closing operations of the fuel gas discharge valve, there are problems of having degradation in the performance of the fuel cell due to a reduction in the concentration of the fuel gas in the fuel gas circulation path, and an increase in the concentration of the fuel gas in exhaust gas discharged from the oxidizing gas exhaust pipe. In order to solve the problems, a technique of determining a failure in the fuel gas discharge valve is suggested (for example, WO 2005/119823).

SUMMARY

However, in the related art, a problem in the fuel gas discharge valve is merely detected, and sufficient consideration is not given to prevention or suppression of an increase in the concentration of the fuel gas in the exhaust gas discharged from the oxidizing gas exhaust pipe due to a problem in the fuel gas discharge valve.

Therefore, in the fuel cell system, a technique of suppressing or preventing an increase in the concentration of the fuel gas in the exhaust gas discharged from the fuel cell system in a case where a problem occurs in the fuel gas discharge valve is desirable. In addition, it is desirable to suppress the operating sound or vibration of the fuel cell system when an increase in the concentration of the fuel gas discharged from the oxidizing gas exhaust pipe due to a problem in the fuel gas discharge valve is prevented or suppressed.

The disclosure can be realized as the following aspects.

A first aspect of the disclosure relates to a fuel cell system including: a fuel cell including an oxidizing gas supply portion, an oxidizing gas discharge portion, a fuel gas supply portion, and a fuel gas discharge portion; an oxidizing gas supplier configured to supply an oxidizing gas; an oxidizing gas supply pipe that connects the oxidizing gas supplier to the oxidizing gas supply portion; an oxidizing gas discharge pipe connected to the oxidizing gas discharge portion; a fuel gas supply pipe connected to the fuel gas supply portion; a fuel gas return pipe that connects the fuel gas discharge portion to the fuel gas supply pipe; a fuel gas discharge valve disposed between the fuel gas return pipe and the oxidizing gas discharge pipe, the fuel gas discharge valve being configured to discharge gas in the fuel gas return pipe to the oxidizing gas discharge pipe when the fuel gas discharge valve is opened; and a controller configured to execute valve closing control to close the fuel gas discharge valve, and determine a flow rate of a diluent gas to be supplied to the oxidizing gas supply portion by the oxidizing gas supplier according to a flow rate of a leakage gas flowing from the fuel gas discharge valve to the oxidizing gas discharge pipe after the execution of the valve closing control, the flow rate of the diluent gas to be supplied to the oxidizing gas supply portion is determined to increase as the flow rate of the leakage gas increases.

With the fuel cell system according to the first aspect, the valve closing control is executed to close the fuel gas discharge valve, and the flow rate of the diluent gas to be supplied to the oxidizing gas supply portion by the oxidizing gas supplier according to the flow rate of the leakage gas flowing from the fuel gas discharge valve to the oxidizing gas discharge pipe after the execution of the valve closing control is determined to increase as the flow rate of the leakage gas increases. Therefore, in a case where a problem occurs in the fuel gas discharge valve, an increase in the concentration of the fuel gas in an exhaust gas discharged from the fuel cell system can be suppressed or prevented, and when an increase in the concentration of the fuel gas discharged from the oxidizing gas discharge pipe due to the problem in the fuel gas discharge valve is prevented or suppressed, the operating sound or vibration of the fuel cell system can be suppressed.

In the fuel cell system according to the first aspect, the controller may be configured to determine the flow rate of the diluent gas according to the flow rate of the leakage gas in a case where the controller determines that the fuel gas discharge valve is in an opened state after the execution of the valve closing control based on the flow rate of the leakage gas. According to the first aspect, after the problem in the fuel gas discharge valve is confirmed, the flow rate of the diluent gas can be determined.

The fuel cell system according to the first aspect may further include a pressure gauge that detects a pressure of a fuel gas in a fuel gas circulation path formed by a portion of the fuel gas supply pipe and the fuel gas return pipe. The controller may be configured to obtain a ratio of a detection pressure value detected by the pressure gauge to a predetermined reference fuel gas pressure value. The controller may be configured to estimate that the flow rate of the leakage gas is higher as the ratio becomes lower. According to the first aspect, the flow rate of the diluent gas can be determined by estimating the magnitude of the flow rate of the leakage gas based on the pressure of the fuel gas.

In the fuel cell system according to the first aspect, the controller may be configured to execute, after the execution of the valve closing control and before execution of a warm-up process of the fuel cell, a warm-up pre-process of increasing the pressure of the fuel gas in the fuel gas circulation path and starting the fuel cell at a stoichiometric air-fuel ratio or at a fuel gas concentration richer than the stoichiometric air-fuel ratio. The controller may be configured to determine the flow rate of the diluent gas during execution of the warm-up pre-process. According to the first aspect, the warm-up process of the fuel cell system can be efficiently executed by executing the warm-up pre-process.

In the fuel cell system according to the first aspect, the reference fuel gas pressure value may be a pressure value of the fuel gas in the fuel gas circulation path when the fuel gas discharge valve is fully opened. The controller may be configured to calculate an opening ratio of the fuel gas discharge valve which is a ratio between a rate of change of the detection pressure value and a rate of change of the reference fuel gas pressure value in a predetermined period. The controller may be configured to estimate that the flow rate of the leakage gas is higher as the opening ratio becomes higher. According to the first aspect, since the rate of change of the pressure value is used, the accuracy of the estimation of the magnitude of the flow rate of the leakage gas can be improved.

In the fuel cell system according to the first aspect, the controller may be configured to execute, after the execution of the valve closing control and before execution of a warm-up operation of the fuel cell, a warm-up pre-process of increasing the pressure of the fuel gas in the fuel gas circulation path and starting the fuel cell at a stoichiometric air-fuel ratio or at a fuel gas concentration richer than the stoichiometric air-fuel ratio. The predetermined period may be an execution period of the warm-up pre-process. The controller may be configured to determine that the fuel gas discharge valve is in a state of being unable to be closed, in a case where the rate of change of the detection pressure value is equal to or higher than a valve closing inability determination threshold. According to the first aspect, since the rate of change of the pressure value is used, the accuracy of the determination of whether or not the fuel gas discharge valve is unable to be closed in an opened state can be improved.

In the fuel cell system according to the first aspect, the controller may be configured to determine the flow rate of the diluent gas to decrease as a target fuel gas pressure during a warm-up process of the fuel cell decreases. According to the first aspect, the flow rate of the leakage gas from the fuel gas discharge valve decreases as the target fuel gas pressure decreases during the warm-up process. Therefore, the operating sound or vibration of the fuel cell system can be reduced by reducing the flow rate of the diluent gas while an increase in the concentration of the fuel gas discharged from the oxidizing gas discharge pipe is prevented or suppressed.

The fuel cell system according to the first aspect may further include: an oxidizing gas bypass pipe that bypasses the fuel cell and allows the oxidizing gas supply pipe and the oxidizing gas discharge pipe to communicate with each other; and a diverter valve disposed in the oxidizing gas bypass pipe, the diverter valve being configured to divert a flow of the oxidizing gas into a first flow flowing toward the oxidizing gas supply portion and a second flow flowing toward the oxidizing gas discharge pipe at an arbitrary ratio. The controller is configured to instruct the diverter valve to have a valve opening degree to decrease a flow ratio of the second flow to the first flow when the controller instructs the oxidizing gas to be supplied at the flow rate of the diluent gas by the oxidizing gas supplier. According to the first aspect, the flow rate of the oxidizing gas to be supplied into the fuel cell can be adjusted without depending on the flow rate of the oxidizing gas supplied by the oxidizing gas supplier.

The fuel cell system according to the first aspect may further include a fuel gas concentration detector that measures a concentration of the fuel gas outside the fuel cell. The controller may be configured to instruct the oxidizing gas supplier to supply the oxidizing gas at the flow rate of the diluent gas, and in a case where the concentration of the fuel gas measured by the fuel gas concentration detector is higher than a determination threshold, increase the flow rate of the diluent gas to be higher than the flow rate of the diluent gas in a case where the fuel gas concentration is equal to or lower than the determination threshold. According to the first aspect, the flow rate of the diluent gas can be determined to correspond to the concentration of the fuel gas outside the fuel cell.

In the fuel cell system according to the first aspect, the controller may be configured to instruct the oxidizing gas supplier to supply the oxidizing gas at the flow rate of the diluent gas during a warm-up process of the fuel cell. According to the first aspect, an increase in the concentration of the fuel gas in the exhaust gas discharged from the fuel cell system due to the fuel gas leaking from the fuel gas discharge valve during the warm-up process can be suppressed or prevented.

A second aspect of the disclosure relates to a control method of a fuel cell system including: determining execution of valve closing control of a fuel gas discharge valve disposed between a fuel gas return pipe that connects a fuel gas discharge portion of a fuel cell to a fuel gas supply pipe, and an oxidizing gas discharge pipe, the fuel gas discharge valve being configured to discharge gas in the fuel gas return pipe to the oxidizing gas discharge pipe; and after determining the execution of the valve closing control, determining a flow rate of a diluent gas to be supplied by an oxidizing gas supplier according to a flow rate of a leakage gas flowing from the fuel gas discharge valve to the oxidizing gas discharge pipe, the flow rate of the diluent gas being determined to increase as the flow rate of the leakage gas increases. With the control method of a fuel cell system according to the second aspect, the same operations and effects as those of the fuel cell system according to the first aspect can be obtained. The control method of a fuel cell system according to the second aspect can be realized in various forms like the fuel cell system according to the first aspect. Furthermore, the control method of a fuel cell system according to the second aspect can be realized as a computer program, or a computer-readable recording medium on which a computer program is recorded.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A fuel cell system and a control method of a fuel cell system according to the disclosure will be described below.

First Embodiment

Figure 1:
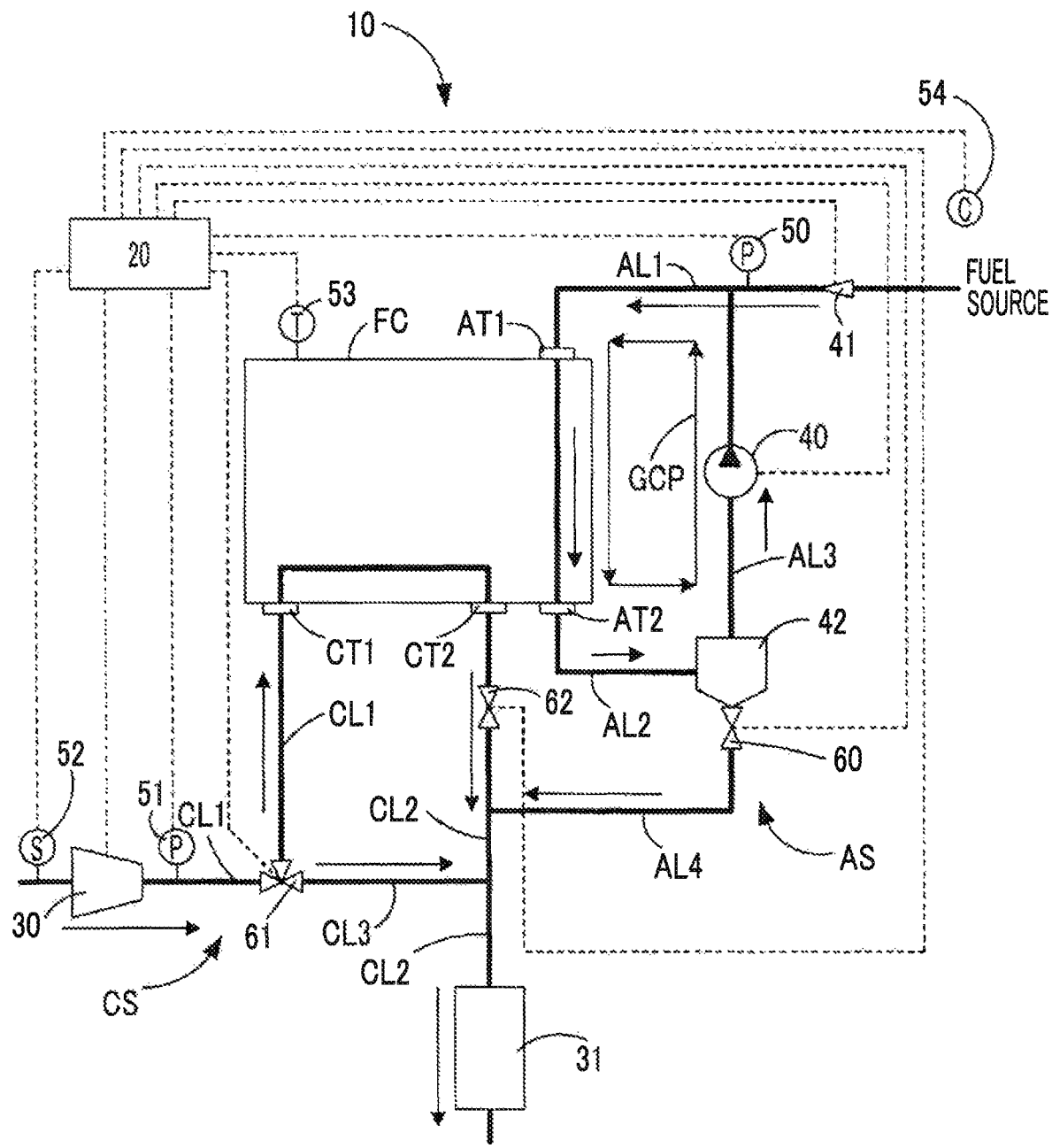
FIG. 1 is an explanatory view illustrating a schematic configuration of a fuel cell system which is common to and applicable to each of embodiments.
Figure 2:
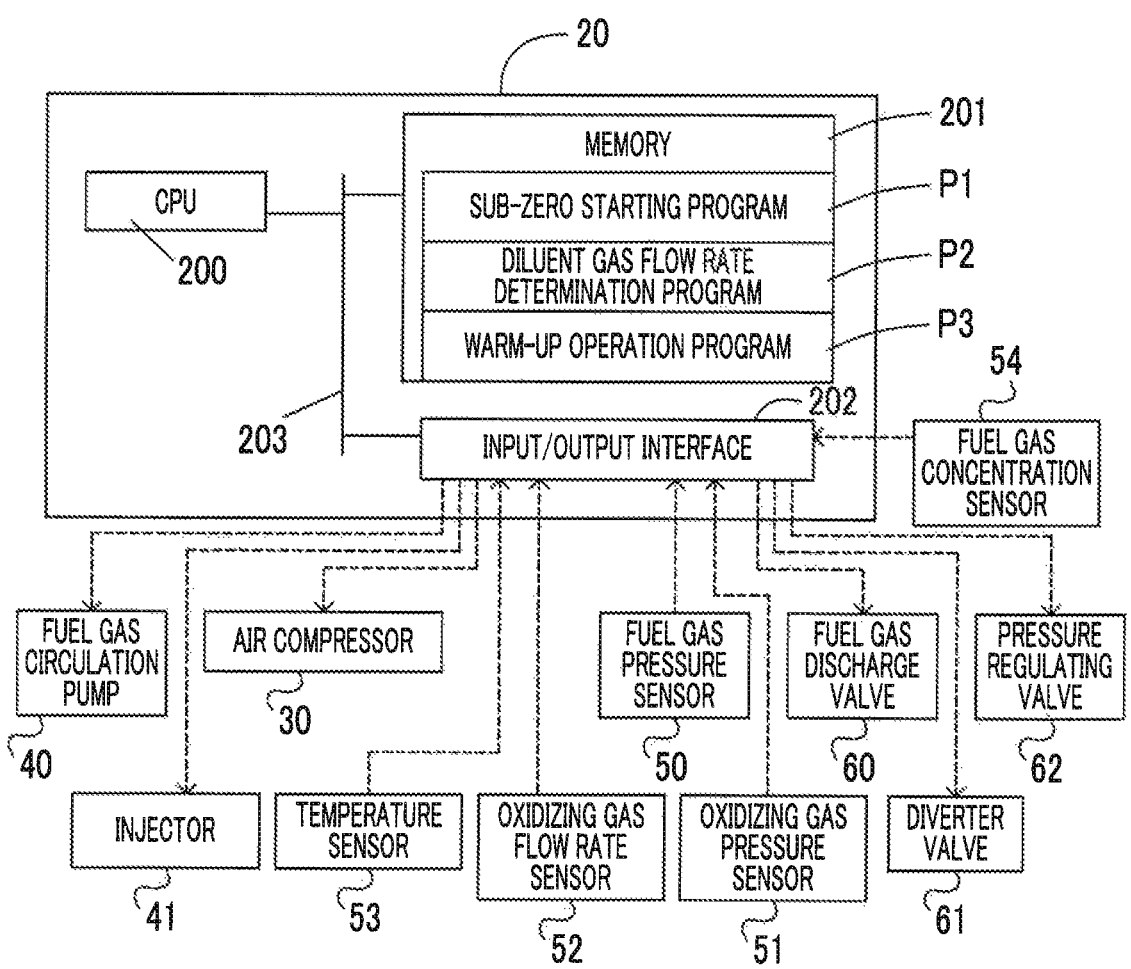
FIG. 2 is a block diagram illustrating a controller which is common to and applicable to each of the embodiments.

FIG. 1 is an explanatory view illustrating a schematic configuration of a fuel cell system 10 which is common to and applicable to each of embodiments. FIG. 2 is a block diagram illustrating a controller 20 which is common to and applicable to each of the embodiments.

The fuel cell system 10 according to the first embodiment includes a fuel cell FC, a fuel gas flow path system AS, an oxidizing gas flow path system CS, and the controller 20. The fuel cell FC is, for example, a polymer electrolyte membrane fuel cell which generates power through an electrochemical reaction of air as an oxidizing gas and hydrogen as a fuel gas. The fuel cell FC includes a fuel gas supply portion AT1 used to introduce the fuel gas into an anode, a fuel gas discharge portion AT2 used to discharge a discharge fuel gas which is the fuel gas after being used in the electrochemical reaction at the anode, an oxidizing gas supply portion CT1 used to introduce the oxidizing gas into a cathode, and an oxidizing gas discharge portion CT2 used to discharge a discharge oxidizing gas which is the oxidizing gas after being used in the electrochemical reaction at the cathode. The discharge fuel gas contains impurities such as moisture and nitrogen as well as the fuel gas and is also called an anode off-gas. The discharge oxidizing gas is also called a cathode off-gas. A temperature sensor 53 used to measure the internal temperature is disposed in the fuel cell FC. The temperature sensor 53 may be a coolant temperature sensor disposed in a cooling circuit of the fuel cell FC (not illustrated) or may be a temperature sensor that has a detection unit inside the fuel cell system FC and directly measures the internal temperature of the fuel cell FC.

The oxidizing gas flow path system CS includes an air compressor 30 as an oxidizing gas supplier that supplies the oxidizing gas, an oxidizing gas supply pipe CL1 that connects the air compressor 30 to the oxidizing gas supply portion CT1, an oxidizing gas discharge pipe CL2 of which a first end is connected to the oxidizing gas discharge portion CT2, and an oxidizing gas bypass pipe CL3 that bypasses the internal flow path of the fuel cell FC and directly connects the oxidizing gas supply pipe CL1 to the oxidizing gas discharge pipe CL2. A diverter valve 61 is disposed in the oxidizing gas supply pipe CL1, a first end of the oxidizing gas bypass pipe CL3 is connected to the diverter valve 61, and a second end of the oxidizing gas bypass pipe CL3 is connected to the oxidizing gas discharge pipe CL2 such that a bypass flow path that bypasses the internal flow path of the fuel cell FC is formed. In the oxidizing gas discharge pipe CL2, a pressure regulating valve 62 is disposed upstream of the joint of the oxidizing gas discharge pipe CL2 and an impurity discharge pipe AL4, that is, near the oxidizing gas discharge portion CT2 of the fuel cell FC. A muffler 31 as a noise reduction device is disposed on a second end side of the oxidizing gas discharge pipe CL2.

A first end of the oxidizing gas supply pipe CL1 is connected to the air compressor 30, and a second end of the oxidizing gas supply pipe CL1 is connected to the oxidizing gas supply portion CT1. In the oxidizing gas supply pipe CL1, an oxidizing gas pressure sensor 51 used to measure the pressure of the oxidizing gas flow path system CS is disposed downstream of the air compressor 30, that is, closer to the oxidizing gas supply portion CT1. In the oxidizing gas supply pipe CL1, an oxidizing gas flow rate sensor 52 is also disposed upstream of the air compressor 30, that is, on a side where air as the oxidizing gas is drawn.

The air compressor 30 is controlled by the controller 20 and compresses the air drawn via an air filter (not illustrated) to introduce the compressed air into the oxidizing gas supply pipe CL1. The amount of the air drawn by the air compressor 30 is measured by the oxidizing gas flow rate sensor 52 and is transmitted to the controller 20. The pressure in the oxidizing gas supply pipe CL1 disposed downstream of the air compressor 30, that is, on the oxidizing gas supply portion CT1 side, that is, the oxidizing gas pressure is measured by the oxidizing gas pressure sensor 51 and is transmitted to the controller 20 as an oxidizing gas pressure value.

The diverter valve 61 is a three-way valve, which is a valve that can divert the oxidizing gas flowing through the oxidizing gas supply pipe CL1 disposed upstream of the diverter valve 61, and arbitrarily adjusts the ratio between the flow rate of the oxidizing gas in a first flow flowing through the oxidizing gas supply pipe CL1 disposed downstream of the diverter valve 61 and the flow rate of the oxidizing gas in a second flow flowing through the oxidizing gas bypass pipe CL3. The opening degree for each flow path, that is, the flow ratio of the diverter valve 61 is controlled by the controller 20. The pressure regulating valve 62 is a valve used to adjust the flow rate of the discharge oxidizing gas discharged from the oxidizing gas discharge portion CT2 of the fuel cell FC, and the valve opening degree, that is, the valve opening ratio of the pressure regulating valve 62 is controlled by the controller 20. The flow rate of the oxidizing gas supplied into the fuel cell FC can be adjusted to a desired flow rate independently from the flow rate of the oxidizing gas supplied by the air compressor 30, by adjusting the valve opening ratio of each of the diverter valve 61 and the pressure regulating valve 62 by the controller 20. For example, the diverter valve 61 and the pressure regulating valve 62 are valves in which a valve body is driven at an arbitrary opening degree using a stepping motor as an actuator.

The fuel gas flow path system AS includes a fuel source that supplies the fuel gas, a fuel gas supply pipe AL1 that connects the fuel source to the fuel gas supply portion AT1, a fuel gas discharge pipe AL2 that connects the fuel gas discharge portion AT2 to a vapor-liquid separator 42, and a fuel gas return pipe AL3 which connects the fuel gas discharge pipe AL2 to the fuel gas supply pipe AL1 via the vapor-liquid separator 42. Although the fuel gas flow path system AS is described in more detail in FIG. 1, the fuel gas discharge pipe AL2 may not be separately provided and the fuel gas discharge portion AT2 and the fuel gas supply pipe AL1 may be connected by the fuel gas return pipe AL3. A portion of the fuel gas supply pipe AL1, the fuel gas discharge pipe AL2, and the fuel gas return pipe AL3 form a fuel gas circulation path GCP. In addition, a portion of the fuel gas supply pipe AL1 means a portion of the fuel gas supply pipe AL1 disposed downstream of a connection point between the fuel gas supply pipe AL1 and the fuel gas return pipe AL3. As the fuel source, for example, a high-pressure hydrogen tank that stores high-pressure hydrogen may be used. A fuel gas concentration sensor 54 is disposed near the fuel source, and the concentration of the fuel gas near the fuel source, that is, the concentration of hydrogen is detected and transmitted to the controller 20.

A first end of the fuel gas supply pipe AL1 is connected to the fuel source, and a second end of the fuel gas circulation path supply pipe AL1 is connected to the fuel gas supply portion AT1. The fuel gas supply pipe AL1 is provided with an injector 41 and a fuel gas pressure sensor 50 in order from the fuel source. The injector 41 is regulated to a prescribed pressure by a pressure regulating valve (not illustrated), and boosts the pressure of the supplied fuel gas to a pressure according to an operation state of the fuel cell system 10, and supplies the fuel gas to the fuel cell FC. The injector 41 has, as an actuator, a piezoelectric element that is driven according to a driving signal in a pulse waveform transmitted from the controller 20, and the pressure of the supplied fuel gas is changed by changing the duty ratio. The fuel gas pressure sensor 50 as a fuel gas pressure gauge measures the pressure in the pipe disposed downstream of the fuel gas pressure sensor 50, that is, the pressure of the fuel gas in the fuel gas circulation path GCP, and transmits the pressure of the fuel gas to the controller 20 as a fuel gas pressure value.

A first end of the fuel gas discharge pipe AL2 is connected to the fuel gas discharge portion AT2, and a second end of the fuel gas discharge pipe AL2 is connected to the vapor-liquid separator 42. A first end of the fuel gas return pipe AL3 is connected to the vapor-liquid separator 42, and a second end of the fuel gas return pipe AL3 is connected to the fuel gas supply pipe AL1. That is, the fuel gas discharge pipe AL2 is connected to the fuel gas return pipe AL3 via the vapor-liquid separator 42. The vapor-liquid separator 42 separates moisture and gas components contained in the discharge fuel gas discharged from the fuel gas discharge portion AT2 of the fuel cell FC to the fuel gas discharge pipe AL2. The vapor-liquid separator 42 is connected to the oxidizing gas discharge pipe CL2 via the impurity discharge pipe AL4 connected to a discharge port of the vapor-liquid separator 42. A fuel gas discharge valve 60 used to discharge the gas in the fuel gas return pipe AL3 to the oxidizing gas discharge pipe CL2 is disposed in the impurity discharge pipe AL4. Impurities such as the moisture separated by the vapor-liquid separator 42 and nitrogen contained in the discharge fuel gas are discharged to the outside of the fuel cell system 10 via the oxidizing gas discharge pipe CL2 when the fuel gas discharge valve 60 is opened according to a valve opening instruction signal from the controller 20. The fuel gas discharge valve 60 is also called a drain and exhaust valve. For example, the fuel gas discharge valve 60 is a valve in which a valve body is driven at an arbitrary opening degree using a stepping motor as an actuator, or a valve in which a valve body is driven at a valve opening position or a valve closing position using an electromagnet as an actuator.

A fuel gas circulation pump 40 is disposed in the fuel gas return pipe AL3. The fuel gas circulation pump 40 is controlled by the controller 20, and as the fuel gas circulation pump 40 is operated, the fuel gas discharged from the fuel gas discharge portion AT2 is resupplied to the fuel gas supply pipe AL1 via the fuel gas discharge pipe AL2, the vapor-liquid separator 42, and the fuel gas return pipe AL3. As a result, the fuel gas can be circulated through the fuel gas circulation path GCP.

The controller 20 will be described. The controller 20 includes a central processing unit (CPU) 200, a memory 201, an input/output interface 202, and an internal bus 203. The CPU 200, the memory 201, and the input/output interface 202 are connected via the bus to enable bidirectional communication. The memory 201 includes a read-only memory as non-volatile storage, for example, a ROM, for a sub-zero starting program P1 used to start the starting of the fuel cell FC in a case where the internal temperature of the fuel cell FC is a sub-zero temperature below zero degrees, a diluent gas flow rate determination program P2 used to determine the increment amount of the oxidizing gas for reducing the concentration of the fuel gas in the oxidizing gas discharge pipe CL2 depending on an operation state of the discharge valve, that is, the flow rate of the diluent gas, and a warm-up operation program P3 used to execute a warm-up operation of the fuel cell FC, and a read-write memory that can be written to and read from by the CPU 200, for example, a RAM. In the fuel cell system 10 according to the first embodiment, at least the diluent gas flow rate determination program P2 may be stored in the memory 201.

The CPU 200 functions as a sub-zero starting execution unit by deploying and executing the sub-zero starting program P1 stored in the memory 201 on the read-write memory, functions as a diluent gas flow rate determination unit by executing the diluent gas flow rate determination program P2, and functions as a warm-up operation execution unit by executing the warm-up operation program P3. In the first embodiment, the memory 201 may store at least the diluent gas flow rate determination program P2, and may arbitrarily store the other programs. The CPU 200 may be a single multi-threaded CPU that can execute multiple execution instructions, or may be a plurality of dedicated CPUs, the CPUs being prepared to respectively execute the programs P1 to P3. In a case where the programs P1 to P3 are realized by the CPUs, individual controllers are constituted of the CPUs and memories that store the respective programs, and cooperative processing is executed by mutual communication between the controllers.

To the input/output interface 202, the fuel gas pressure sensor 50, the oxidizing gas pressure sensor 51, the oxidizing gas flow rate sensor 52, the temperature sensor 53, and the fuel gas concentration sensor 54 are connected via detection signal lines. To the input/output interface 202, the fuel gas circulation pump 40, the injector 41, the fuel gas discharge valve 60, the diverter valve 61, and the pressure regulating valve 62 are connected via control signal lines.

Figure 3:
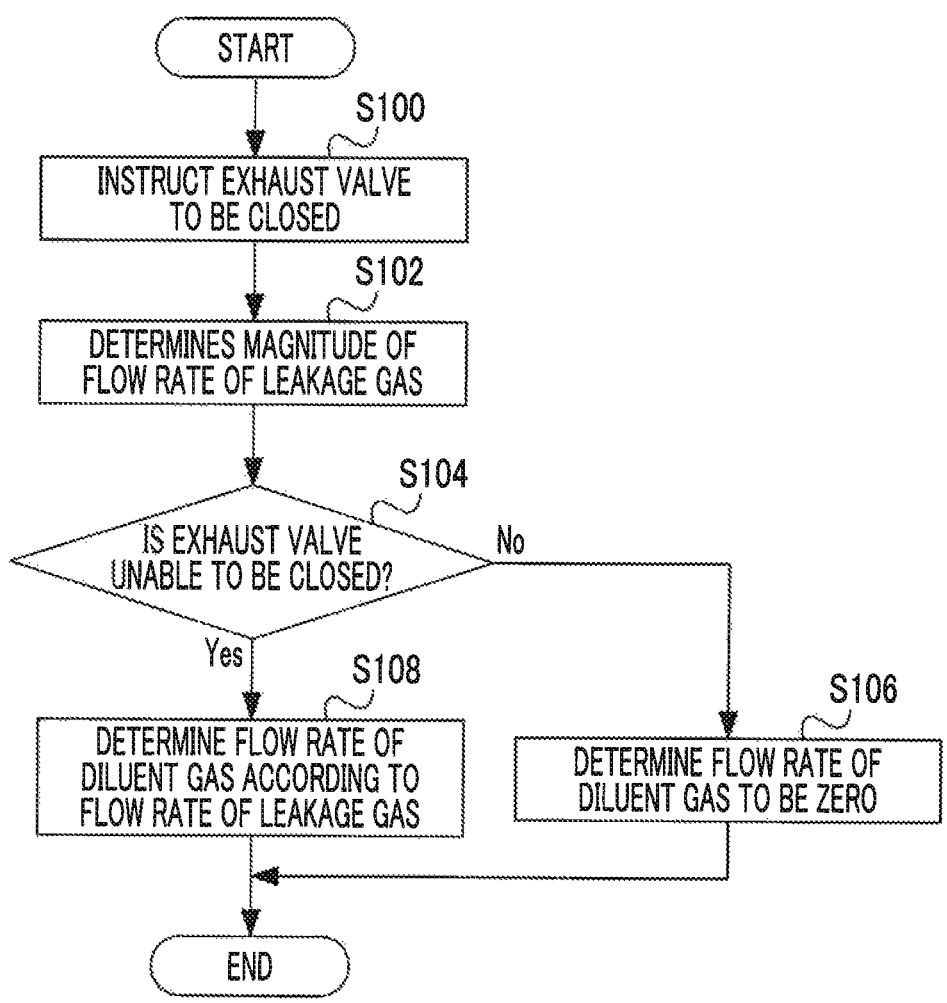
FIG. 3 is a flowchart showing a process routine of a diluent gas flow rate determination process executed in the fuel cell system according to a first embodiment.
Figure 4:
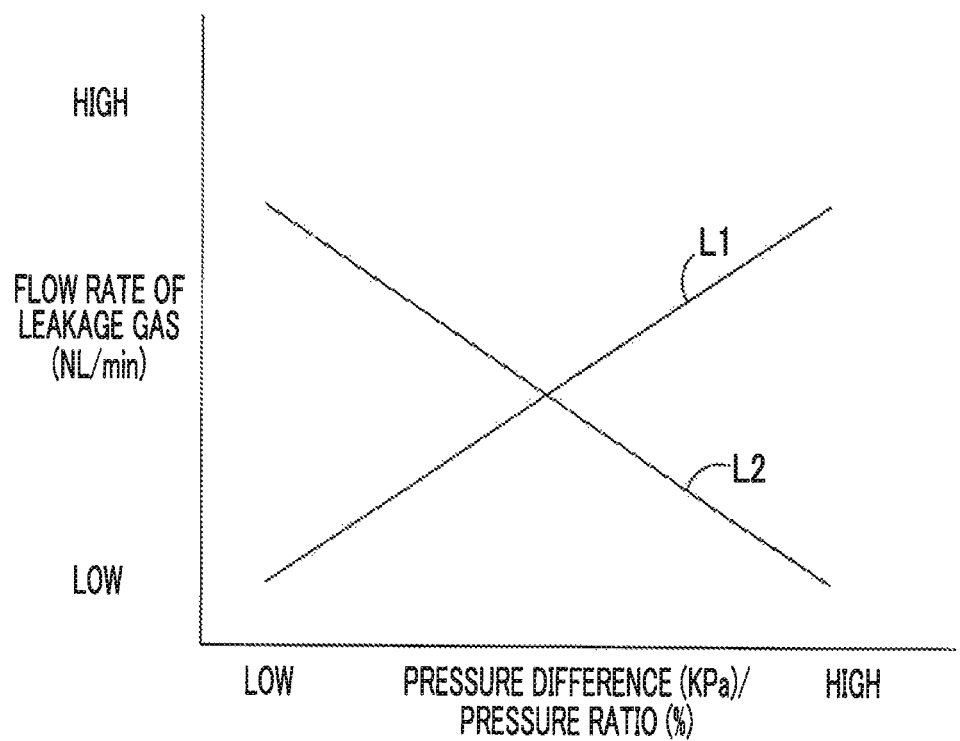
FIG. 4 is an explanatory view showing an example of the relationship between pressure difference/pressure ratio and the flow rate of a leakage gas.
Figure 5:
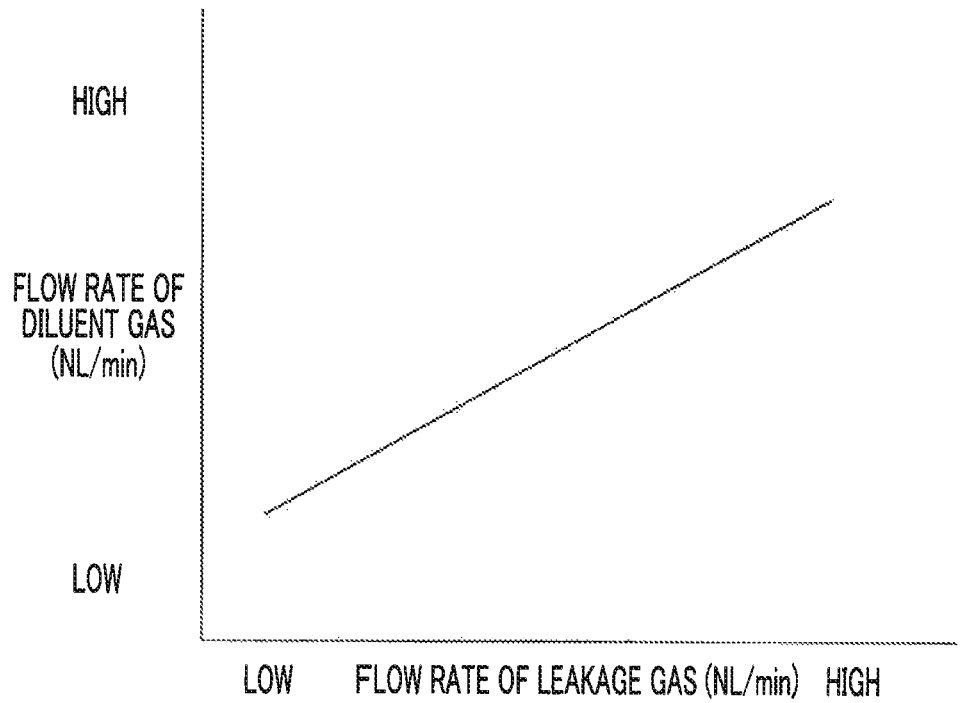
FIG. 5 is an explanatory view conceptually showing a map used to determine the flow rate of a diluent gas from the flow rate of the leakage gas used in the fuel cell system according to the first embodiment.

A diluent gas flow rate determination process which is used to reduce or prevent an increase in the concentration of the fuel gas in the exhaust gas and is executed in the fuel cell system 10 according to the first embodiment will be described with reference to FIGS. 3 to 5. FIG. 3 is a flowchart showing a process routine of the diluent gas flow rate determination process executed in the fuel cell system 10 according to the first embodiment. FIG. 4 is an explanatory view showing an example of the relationship between pressure difference/pressure ratio and the flow rate of a leakage gas. FIG. 5 is an explanatory view conceptually showing a map used to determine the flow rate of a diluent gas from the flow rate of the leakage gas used in the fuel cell system 10 according to the first embodiment. In the fuel cell system 10 according to the first embodiment, the diluent gas flow rate determination process is a process which is repeatedly executed when the fuel cell FC is in an operation state in which the fuel gas discharge valve 60 is instructed to be closed, for example, at the time of starting the fuel cell system 10, when moisture in the vapor-liquid separator 42 is emitted, or when gas in the fuel gas circulation path GCP is purged, and determines the flow rate of a diluent gas used to dilute the concentration of the fuel gas in the oxidizing gas discharge pipe CL2 in a case where the fuel gas discharge valve 60 cannot be closed. Here, the diluent gas is an oxidizing gas used to dilute the concentration of the fuel gas, and the flow rate of the diluent gas is the flow rate of the oxidizing gas supplied to the fuel cell FC in an increment amount corresponding to a leakage flow rate separately from the flow rate of the oxidizing gas needed for the electrochemical reaction for realizing a needed output.

The CPU 200 executes the process routine shown in FIG. 3 by starting the diluent gas flow rate determination program P2 along with the starting of the fuel cell system 10. The CPU 200 transmits a valve closing instruction to the fuel gas discharge valve 60 (step S100). The fuel gas discharge valve 60 that receives the valve closing instruction moves its valve body to a valve closing position. Here, there may be cases where the valve body cannot be moved to the valve closing position due to a malfunction in the actuator or the valve body of the fuel gas discharge valve 60. Furthermore, depending on an operation environment of the fuel cell system 10, the valve body is incompletely closed due to foreign matter incorporated therein even in a case where there is no malfunction in the actuator of the fuel gas discharge valve 60 itself. For example, at the time of starting at sub-zero temperatures, there may be cases where the valve body cannot be moved to the valve closing position due to ice particles into which moisture discharged from the fuel gas discharge valve 60 is frozen, or due to freezing of or ice accretion on the valve body itself when moisture is discharged (when the valve is opened). In the specification, valve closing control of the fuel gas discharge valve 60 may be executed by another CPU instead of the CPU 200 that is executing the diluent gas flow rate determination program P2. In this case, the CPU 200 may receive a signal indicating whether or not the valve closing control is executed.

The CPU 200 determines the magnitude of the flow rate (NL/min) of the leakage gas in the fuel gas discharge valve 60 (step S102). For example, a pressure difference (L1) which is the difference between a reference fuel gas pressure value SP detected by the fuel gas pressure sensor 50 when the fuel gas circulation path GCP in a case where the fuel gas discharge valve 60 is in a closed state is set to a known pressure and a fuel gas pressure value DP detected by the fuel gas pressure sensor 50 at the time of the starting of the fuel cell FC, or a pressure ratio (L2) of the fuel gas pressure value DP to the reference fuel gas pressure value SP, and the flow rate of the leakage gas have the relationship shown in FIG. 4. The CPU 200 determines that the flow rate of the leakage gas is higher as the pressure difference is larger or the pressure ratio is smaller according to the relationship shown in FIG. 4. The magnitude of the flow rate of the leakage gas includes a case where there is no leakage gas, that is, a case of a leakage gas flow rate of zero. In a case where the difference between the reference fuel gas pressure value SP and the fuel gas pressure value DP is zero or equal to or lower than a non-leakage reference determination value, a leakage gas flow rate of zero is determined. The leakage gas flow rate corresponding to a difference of equal to or lower than the non-leakage reference determination value is, for example, 0.3 NL/min, and the non-leakage reference determination value can be regarded as a valve closing inability determination threshold of the fuel gas discharge valve 60. Alternatively, the difference or ratio between a time-varying value of the reference fuel gas pressure value SP and a time-varying value of the fuel gas pressure value DP in a predetermined period may also be used. Determination accuracy can be improved by using the time-varying values. In addition, in a case where a flowmeter is disposed upstream of the fuel gas discharge valve 60, that is, on the vapor-liquid separator 42 side, the CPU 200 may determine the magnitude of the flow rate of the leakage gas based on the flow rate measured by the flowmeter. Alternatively, the CPU 200 may perform determination based on an opening ratio described in a second embodiment.

The CPU 200 determines whether or not the fuel gas discharge valve 60 is unable to be closed based on the magnitude of the determined leakage flow rate, that is, whether or not the fuel gas discharge valve 60 has a problem and is in an opened state (step S104). In a case where the CPU 200 determines that the flow rate of the leakage gas is zero in step S102, the CPU 200 determines that the fuel gas discharge valve 60 is closed (No in step S104) and proceeds to step S106. The CPU 200 sets the flow rate of the diluent gas to zero (step S106) and ends the process routine.

In a case where the CPU 200 determines that the flow rate of the leakage gas is not zero in step S102 (Yes in step S104), the CPU 200 determines that the fuel gas discharge valve 60 is unable to be closed and proceeds to step S108. The CPU 200 determines the flow rate of the diluent gas to increase the increment amount as the flow rate of the leakage gas increases according to the determined magnitude of the flow rate of the leakage gas, for example, using the prepared map shown in FIG. 5 (step S108) and ends the process routine. The map shown in FIG. 5 is an example, and a characteristic line may have a characteristic in which the flow rate of the diluent gas increases in proportion to the flow rate of the leakage gas or may have a characteristic in which the flow rate of the diluent gas increases stepwise. The map used to determine the flow rate of the diluent gas may also be a map having a plurality of representative points as discrete values, and the flow rate of the diluent gas between the discrete values may be determined by a complementary operation.

The flow rate of the diluent gas determined in step S108 is added to the flow rate of the oxidizing gas according to an operation state set in an operation control process of the fuel cell system 10 executed subsequent to the diluted gas flow rate determination process, and the total flow rate of the oxidizing gas is used as an instruction flow rate for the flow rate of the oxidizing gas for the air compressor 30. Examples of the operation control process of the fuel cell system 10 include a warm-up process of the fuel cell FC, and power generation control, so-called normal control, of the fuel cell FC based on a needed output value executed after a process of discharging impurities from the vapor-liquid separator 42. Problems in the fuel gas discharge valve 60 include problems such as a state in which the valve is unable to be closed due to incorporation of ice particles and adfreezing of the valve body, and the problems mentioned above are temporary problems that can be solved as the temperature of the fuel cell increases. Therefore, in a case where the temporary problems are solved, supply of the flow rate of the oxidizing gas including the determined flow rate of the diluent gas is stopped. The concentration of the fuel gas in the oxidizing gas may be lower than a predetermined concentration when the fuel gas is discharged from the fuel cell system 10. Even in the case where the diverter valve 61 and the oxidizing gas bypass pipe CL3 are provided, since the oxidizing gas bypass pipe CL3 joins the oxidizing gas discharge pipe CL2 ahead of the muffler 31, the flow rate of the diluent gas may be determined regardless of the presence or absence of the diverter valve 61 and the oxidizing gas bypass pipe CL3.

With the fuel cell system 10 according to the first embodiment described above, in a case where there is a problem that the fuel gas discharge valve 60 is unable to be closed occurs, the oxidizing gas is supplied at an oxidizing gas flow rate to which the flow rate of the diluent gas is added. Therefore, an increase in the concentration of the fuel gas discharged to the outside of the fuel cell system 10 can be suppressed or prevented.

With the fuel cell system 10 according to the first embodiment, the magnitude of the flow rate of the diluent gas is determined from the magnitude of the flow rate of the leakage gas from the fuel gas discharge valve 60. More specifically, the flow rate of the diluent gas increases as the flow rate of the leakage gas from the fuel gas discharge valve 60 increases. Therefore, in a case where the flow rate of the leakage gas is low, the flow rate of the diluent gas is also low, the operating sound and vibration of the air compressor 30 transmitted to the vehicle cabin can be suppressed, and thus the sound volume and vibration leaking from the fuel cell system 10 can be suppressed. Furthermore, an increase in the concentration of the fuel gas discharged to the outside of the fuel cell system 10 due to the malfunction in the fuel gas discharge valve 60 can be suppressed or prevented.

In addition, the CPU 200 determines the flow rate of the diluent gas to be zero and determines the flow rate of the diluent gas to increase as the flow rate of the leakage gas increases, respectively in steps S106 and S108. However, the CPU 200 may also determine the flow rate of the oxidizing gas according to the operation state of the fuel cell FC and set the total flow rate of the oxidizing gas to instruct the air compressor 30. For example, in a case where operation control executed after the diluted gas flow rate determination process is the warm-up process, the needed flow rate of the oxidizing gas may be determined in advance.

In the first embodiment, the malfunction in closing the fuel gas discharge valve 60 is determined. However, the flow rate of the diluent gas may also be increased as the flow rate of the leakage gas increases without determination of the malfunction in closing the valve. That is, the flow rate of the diluent gas is determined depending on the flow rate of the leakage gas using a diluent gas flow rate of zero determined in a case where no leakage gas from the fuel gas discharge valve 60 is determined, and the concentration of the fuel gas in the oxidizing gas discharge pipe CL2 may be reduced. Even in this case, in a case where the flow rate of the leakage gas is extremely low, the absence of the leakage gas is determined, and the operation of the air compressor 30 can be suppressed.

The fuel cell system 10 according to the first embodiment may be mounted in a moving body such as a vehicle or a train, or may be fixed and installed as a household or industrial power supply or the like. The process of determining the flow rate of the diluent gas may be executed as a portion of a low-temperature starting process executed when the internal temperature of the fuel cell FC is a low temperature, for example, less than zero degrees or less than 4 degrees. Furthermore, the warm-up process of the fuel cell FC is executed after the process of determining the flow rate of the diluent gas, and at this time, the air compressor 30 may be controlled to realize the flow rate of the oxidizing gas obtained by adding the determined flow rate of the diluent gas to the flow rate of the oxidizing gas set according to the operation state.

In the first embodiment, when the flow rate of the diluent gas is determined, a target fuel gas pressure during the operation control of the fuel cell FC executed after the diluted gas flow rate determination process may be considered. That is, as the target fuel gas pressure decreases, the pressure in the fuel gas circulation path GCP decreases, and the pressure difference from the atmospheric pressure decreases. As a result, the flow rate of the leakage gas discharged from the fuel gas discharge valve 60 also decreases. Therefore, the flow rate of the diluent gas determined according to the flow rate of the leakage gas may be decreased as the target fuel gas pressure decreases. As a specific reduction method, for example, the relationship between the concentration of the fuel gas in the oxidizing gas discharge pipe CL2 and the target fuel gas pressure may be experimentally obtained in advance, a coefficient that decreases as the target fuel gas pressure decreases may be determined in advance, and the determined flow rate of the diluent gas may be multiplied by the coefficient.

In the first embodiment, the oxidizing gas bypass pipe CL3 may not be provided.

Second Embodiment

Figure 6:
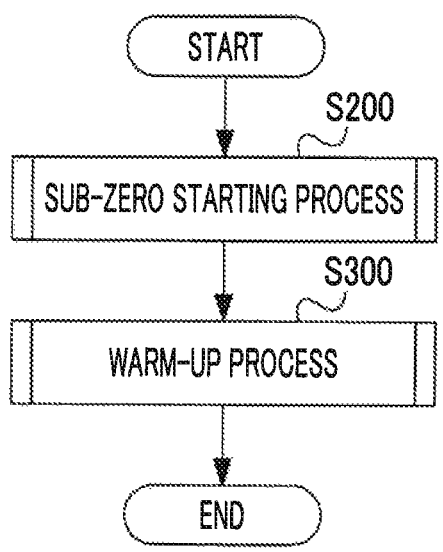
FIG. 6 is a flowchart showing a process routine executed at the time of starting of the fuel cell system according to a second embodiment.
Figure 7:
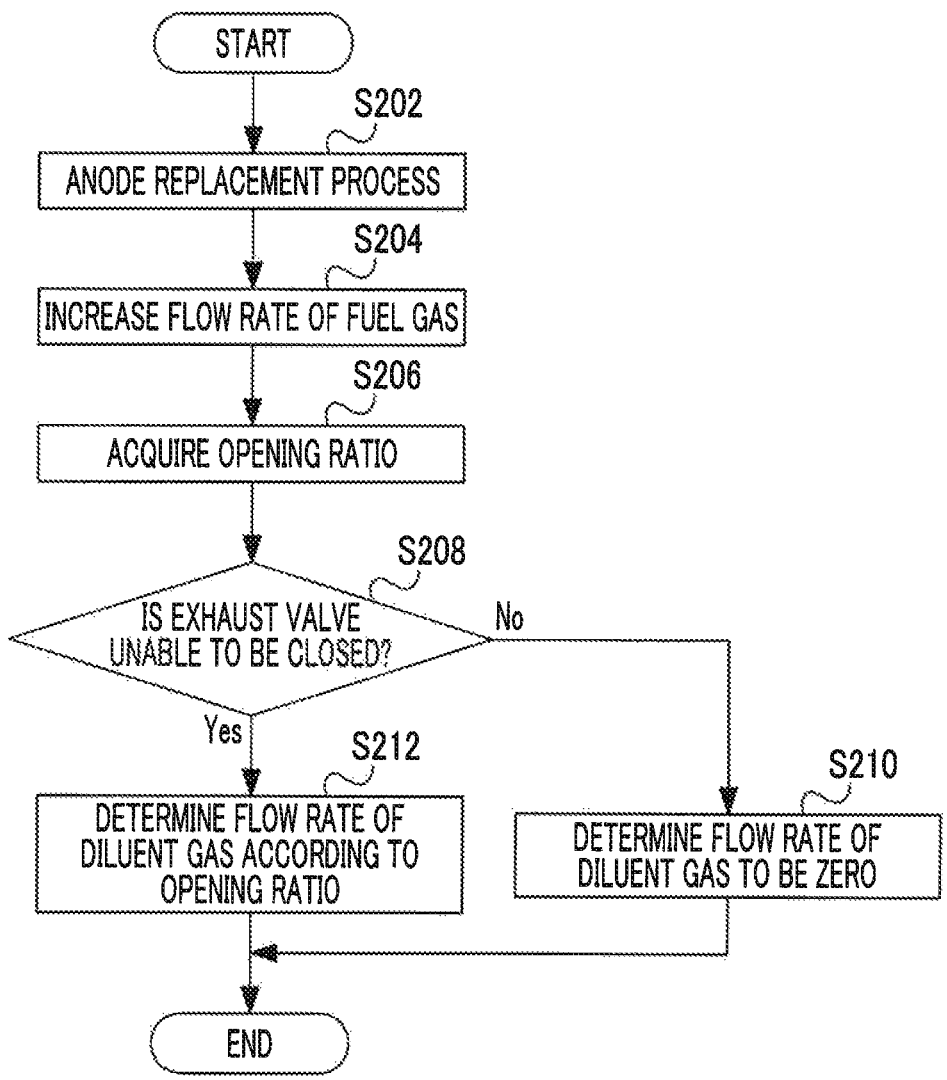
FIG. 7 is a flowchart showing a process routine of a sub-zero starting process executed in the fuel cell system according to the second embodiment.
Figure 8:
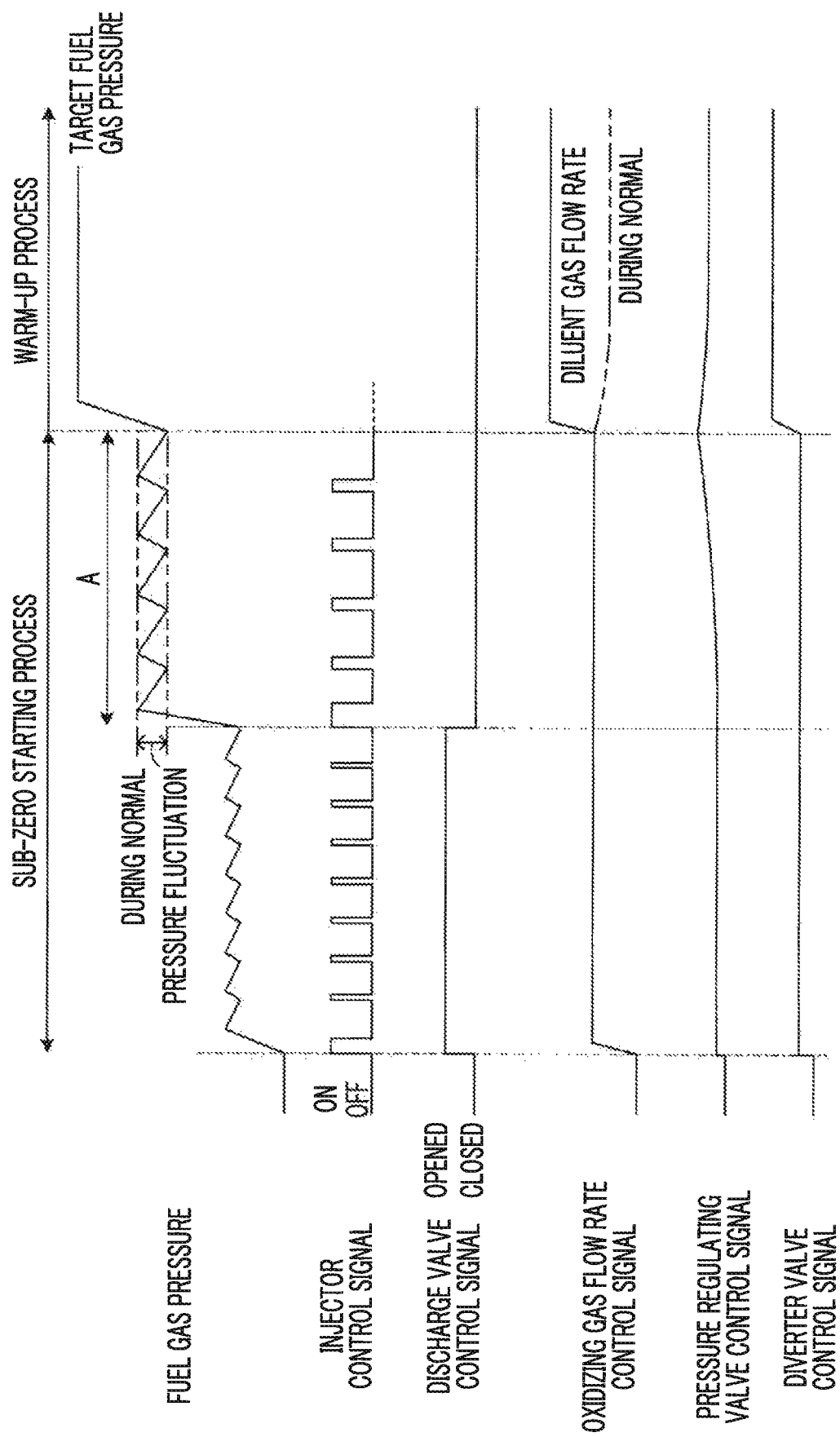
FIG. 8 is a timing chart showing temporal changes of each of control parameters and detection values when each process shown in FIG. 6 is executed.

The fuel cell system 10 according to a second embodiment will be described with reference to FIGS. 6 to 9. FIG. 6 is a flowchart showing a process routine executed at the time of starting of the fuel cell system 10 according to the second embodiment. FIG. 7 is a flowchart showing a process routine of a sub-zero starting process executed in the fuel cell system 10 according to the second embodiment. FIG. 8 is a timing chart showing temporal changes of each of control parameters and detection values when each process shown in FIG. 6 is executed. The fuel cell system 10 according to the second embodiment is mounted in a four-wheeled vehicle to be used. In the second embodiment, the sub-zero starting process and the warm-up process subsequent to the sub-zero starting process are executed, and the process of determining the flow rate of the diluent gas is executed as a portion of the sub-zero starting process.

As shown in FIG. 6, when the CPU 200 detects a need for starting the fuel cell system 10, the CPU 200 determines whether or not the internal temperature of the fuel cell FC measured by the temperature sensor 53 is a sub-zero temperature, that is, less than zero degrees, and in a case of less than zero degrees, the CPU 200 executes the sub-zero starting process. The need for starting the fuel cell system 10 is input, for example, a system start/end switch or an ignition switch. The configuration of the fuel cell system 10 according to the second embodiment is the same as that of the fuel cell system 10 according to the first embodiment, like elements are denoted by like reference numerals used in the first embodiment in the configuration, and the detailed description thereof will be omitted.

The CPU 200 executes the sub-zero starting process by starting the sub-zero starting program P1 (step S200). The CPU 200 starts the warm-up operation program P3 when the sub-zero starting process is completed, executes the warm-up process (step S300), and ends the process routine executed at the time of the starting after the warm-up process is completed. After the warm-up process is ended, control of the fuel cell system 10 according to a needed output for a driver, which is not aimed at warming-up, is executed. Hereinafter, details of the sub-zero starting process will be described with reference to FIG. 7. The CPU 200 executes an anode replacement process (step S202). The anode replacement process is a process of pushing out gas in the anode, more specifically, in the fuel gas circulation path GCP and drawing in the fuel gas with a relatively high purity at the time of starting the fuel cell FC. As shown in FIG. 8, the CPU 200 transmits a valve opening instruction to the fuel gas discharge valve 60, and transmits a driving signal used to realize a needed fuel gas flow rate for the anode replacement process to the injector 41. The CPU 200 transmits a driving signal used to realize a needed oxidizing gas flow rate for reducing the concentration of the fuel gas discharged from the fuel gas discharge valve 60, to the air compressor 30, and transmits control signals to the diverter valve 61 and the pressure regulating valve 62 to cause the flow rate of the oxidizing gas at the cathode of the fuel cell FC to become a needed flow rate for the anode replacement process.

Since the fuel gas discharge valve 60 is opened, the pressure of the fuel gas measured by the fuel gas pressure sensor 50 repeatedly fluctuates as shown in FIG. 8 as the fuel gas is discharged from the injector 41. When a predetermined period for the anode replacement process is ended, the CPU 200 transmits a valve closing signal to the fuel gas discharge valve 60 and executes a warm-up pre-process of increasing the flow rate of the fuel gas (step S204). The warm-up pre-process is a process used to cause the air-fuel ratio to be a stoichiometric air-fuel ratio or to be richer than the stoichiometric air-fuel ratio by increasing the concentration of the fuel gas in the fuel cell FC, thereby increasing the calorific value under the electrochemical reaction during the warm-up operation and accelerating an increase in the temperature of the fuel cell FC. The warm-up pre-process is executed for a predetermined period A shown in FIG. 8. The CPU 200 transmits a driving signal used to realize a needed fuel gas flow rate for the warm-up pre-process to the injector 41. The CPU 200 transmits a control signal used to increase a valve opening ratio to the pressure regulating valve 62 to increase the flow rate of the oxidizing gas in the fuel cell FC.

In the second embodiment, the diluted gas flow rate determination process is executed during the period A while the warm-up pre-process is executed. When the warm-up pre-process is started, that is, when the anode replacement process is ended, the CPU 200 executes the diluent gas flow rate determination program P2. The warm-up pre-process may also be executed by a different CPU from the CPU 200. It can be said that the diluted gas flow rate determination process is started in a case where the following conditions are satisfied. •The sub-zero starting process is not ended. •The anode replacement process is not completed. •The warm-up process is not started (before execution). •The valve closing instruction is transmitted to the fuel gas discharge valve 60.

The CPU 200 acquires the opening ratio of the fuel gas discharge valve 60 (step S206). The opening ratio x is defined as the ratio between a rate of pressure change of the fuel gas (dP/dt) measured by the fuel gas pressure sensor 50 during the period A and a reference rate of pressure change (dPs/dt) and is defined by the following expression. x=(dP/dt)/reference rate of pressure change (dPs/dt). The reference rate of pressure change is set by measuring the pressure of the fuel gas of the fuel gas circulation path GCP set to a pressure for the warm-up pre-process in a state in which the fuel gas discharge valve 60 is fully opened for the same period as the period A using the fuel gas pressure sensor 50. Alternatively, instead of the opening ratio, the ratio between a fuel gas pressure value measured by the fuel gas pressure sensor 50 during the period A and a reference pressure value may be used. The reference fuel gas pressure value is a prepared value measured by the fuel gas pressure sensor 50 when the fuel gas circulation path GCP is set to the pressure for the warm-up pre-process in a state in which the fuel gas discharge valve 60 is fully closed. In addition, the opening ratio may be acquired by attaching an opening degree sensor that detects a valve opening degree to the fuel gas discharge valve 60 and using the opening degree detected by the opening degree sensor.

In a case where the fuel gas discharge valve 60 has no malfunction and is in a closed state, the pressure of the fuel gas measured by the fuel gas pressure sensor 50 continuously has a value represented as a normal value in FIG. 8, and thus the rate of pressure change is zero or extremely small. On the other hand, in a case where the fuel gas discharge valve 60 has a malfunction and is not in the closed state, that is, in a case where the fuel gas discharge valve 60 is slightly opened due to incorporation of ice particles or freezing of the valve body, the pressure of the fuel gas measured by the fuel gas pressure sensor 50 repeatedly fluctuate as shown in FIG. 8, and as a result, the rate of pressure change increases. Therefore, the ratio of the detected rate of pressure change of the pressure value to the reference rate of pressure change increases, and thus the opening ratio increases. The pressure may not continuously fluctuate unlike in FIG. 8 and may fluctuate discretely, for example, in a rectangular shape.

The CPU 200 determines whether or not the fuel gas discharge valve 60 is in a state of being unable to be closed based on the detected rate of pressure change (step S208). By the determination, the process of determining the flow rate of the diluent gas can be executed under the condition that the fuel gas discharge valve 60 is held or fixed in an opened state and the concentration of the fuel gas needs to be diluted with the diluent gas. In a case where the detected rate of pressure change is lower than the predetermined valve closing inability determination threshold, the CPU 200 determines that the fuel gas discharge valve 60 is able to be closed, that is, the fuel gas discharge valve 60 normally operates. On the other hand, in a case where the detected rate of pressure change is equal to or higher than the valve closing inability determination threshold, the CPU 200 determines that the fuel gas discharge valve 60 has a problem, is in the opened state, and is unable to be closed. The flow rate of the leakage gas corresponding to the valve closing inability determination threshold is, for example, 0.3 NL/min. In a case where the opening ratio instead of the rate of pressure change is zero or lower than a predetermined determination value close to zero, the CPU 200 may determine that the fuel gas discharge valve 60 is able to be closed, and in a case where the opening ratio is equal to or higher than the predetermined determination value, the CPU 200 may determine that the fuel gas discharge valve 60 is in an immovable state while being opened.

In a case where the CPU 200 determines that the fuel gas discharge valve 60 is not in the state of being unable to be closed, that is, is in a normal state (No in step S208), the CPU 200 proceeds to step S210. The CPU 200 sets the flow rate of the diluent gas to zero (step S210) and ends the process routine.

Figure 9:
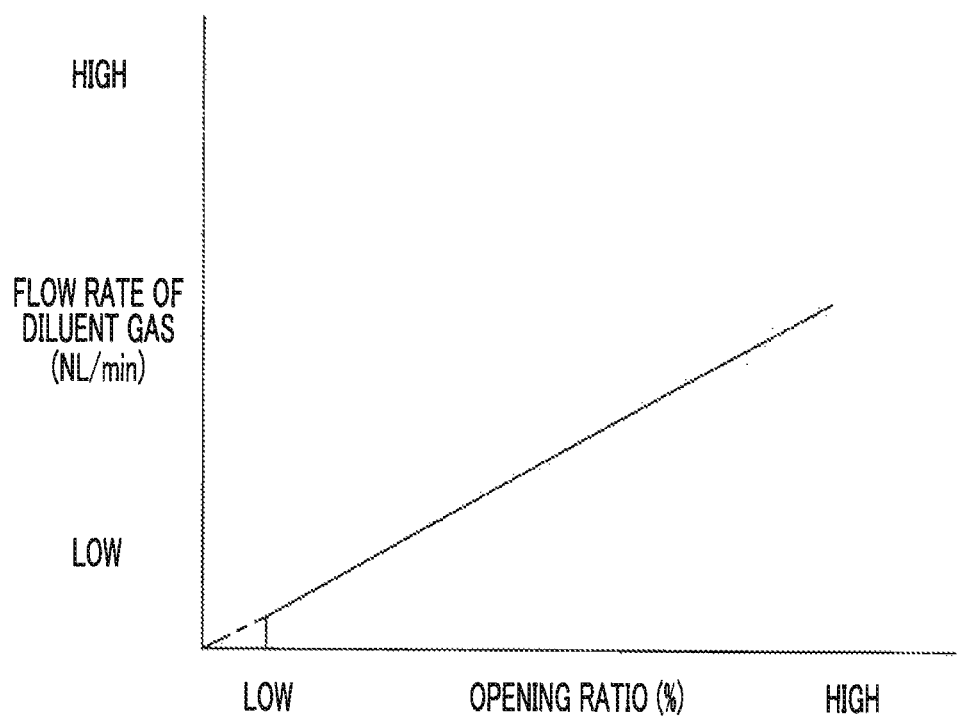
FIG. 9 is an explanatory view conceptually showing a map used to determine the flow rate of the diluent gas from an opening ratio used in the fuel cell system according to the second embodiment.

In a case where the CPU 200 determines that the fuel gas discharge valve 60 is in the state of being unable to be closed (Yes in step S208), the CPU 200 proceeds to step S212. A correspondence relationship, for example, shown in FIG. 9 is defined between the opening ratio (%) of the fuel gas discharge valve 60 and the flow rate of the diluent gas (NL/min). FIG. 9 is an explanatory view conceptually showing a map used to determine the flow rate of the diluent gas from the opening ratio used in the fuel cell system 10 according to the second embodiment. Using the prepared map shown in FIG. 9, the CPU 200 determines the flow rate of the diluent gas such that the increment amount increases as the flow rate of the leakage gas increases according to the acquired magnitude of the opening ratio (%) (step S212) and ends the process routine. The map shown in FIG. 9 is an example, and a characteristic line may have a characteristic in which the flow rate of the diluent gas increases in proportion to the opening ratio or may have a characteristic in which the flow rate of the diluent gas increases stepwise. In addition, as indicated by the dash-dotted line, the flow rate of the diluent gas corresponding to an opening ratio of 0% may be determined, and as indicated by the solid line, the flow rate of the diluent gas may be set to zero at an opening ratio close to 0%. The map used to determine the flow rate of the diluent gas may also be a map having a plurality of representative points as discrete values, and the flow rate of the diluent gas between the discrete values may be determined by a complementary operation.

When the sub-zero starting process is completed, the CPU 200 executes the warm-up process accompanied by power generation by starting the warm-up operation program P3 (step S300). The CPU 200 transmits a control signal to the injector 41 to realize the target fuel gas pressure during the warm-up process, and determines the flow rate of the oxidizing gas corresponding to the target fuel gas pressure. As shown in FIG. 8, the CPU 200 transmits a control signal to the air compressor 30 to realize the flow rate of the oxidizing gas obtained by adding the flow rate of the diluent gas determined in the diluted gas flow rate determination process as an increment amount to the determined flow rate of the oxidizing gas. As a result, the flow rate of the oxidizing gas flowing through the oxidizing gas discharge pipe CL2 is higher than the flow rate of the oxidizing gas corresponding to the needed output for the fuel cell system 10. In a case where the flow rate of the diluent gas is zero, that is, in a case where the fuel gas discharge valve 60 normally operates, the flow rate of the oxidizing gas is reduced to set the air-fuel ratio in the fuel cell FC to be lean.

The supply of the flow rate of the oxidizing gas increased by the determined flow rate of the diluent gas is continued until the flow rate of the leakage gas becomes equal to or lower than a determination value. As the determination value, for example, a value of 0.1 NL/min is used. The flow rate of the leakage gas can be estimated, for example, by whether or not a change in the fuel gas pressure detected by the fuel gas pressure sensor 50 during the warm-up process is equal to or lower than a predetermined change value corresponding to the flow rate of the determination value. Alternatively, the supply of the flow rate of the oxidizing gas increased by the determined flow rate of the diluent gas may be continued until a predetermined time during the warm-up process elapses, or until the internal temperature of the fuel cell FC measured by the temperature sensor 53 exceeds a predetermined temperature. One of the problems in the fuel gas discharge valve 60 presumed in the second embodiment is the state in which the valve is unable to be closed or adfreezing due to incorporation of ice particles or freezing of the valve body, and the problem can be solved with elapse of time. Therefore, it is possible to stop the supply of the flow rate of the oxidizing gas increased by the determined flow rate of the diluent gas at a timing at which the problem in the fuel gas discharge valve 60 is expected to be solved. As a result, reducing the operating sound or vibration of the fuel cell system 10 caused by the operation of the air compressor 30 due to an increase in the flow rate of the oxidizing gas and suppressing the discharge of the oxidizing gas with a relatively high fuel gas concentration to the outside of the fuel cell system 10 can be compatible with each other, and a reduction in the power consumption by the air compressor 30 that operates under a load due to the increase in the flow rate of the oxidizing gas can be achieved.

The CPU 200 reduces the ratio of the flow rate of the oxidizing gas flowing through the oxidizing gas bypass pipe CL3 to the oxidizing gas supply pipe CL1, that is, the flow ratio, by controlling the diverter valve 61, and reduces the increased flow rate of the oxidizing gas for the fuel cell FC by controlling the pressure regulating valve 62. The CPU 200 completes the warm-up process when the operation state of the fuel cell system 10 matches predetermined conditions and ends the starting process of the fuel cell system 10. The concentration of the fuel gas in the oxidizing gas may be lower than a predetermined concentration when the fuel gas is discharged from the fuel cell system 10. Even in the case where the diverter valve 61 and the oxidizing gas bypass pipe CL3 are provided, since the oxidizing gas bypass pipe CL3 joins the oxidizing gas discharge pipe CL2 ahead of the muffler 31, the flow rate of the diluent gas may be determined regardless of the presence or absence of the diverter valve 61 and the oxidizing gas bypass pipe CL3.

With the fuel cell system 10 according to the second embodiment described above, in a case where there is a problem that the fuel gas discharge valve 60 is unable to be closed, the oxidizing gas is supplied at an oxidizing gas flow rate to which the flow rate of the diluent gas is added. Therefore, an increase in the concentration of the fuel gas discharged to the outside of the fuel cell system 10 can be suppressed or prevented.

With the fuel cell system 10 according to the second embodiment, the magnitude of the flow rate of the diluent gas is determined from the opening ratio of the fuel gas discharge valve 60. More specifically, the flow rate of the diluent gas increases as the opening ratio of the fuel gas discharge valve 60 increases. Therefore, in a case where the opening ratio is low and the flow rate of the leakage gas is low, the flow rate of the diluent gas is also low, the operating sound and vibration of the air compressor 30 can be suppressed, and thus the quietness of the vehicle is improved. Furthermore, an increase in the concentration of the fuel gas discharged to the outside of the fuel cell system 10 due to the malfunction in the fuel gas discharge valve 60 can be suppressed or prevented.

The technical advantages of the fuel cell system 10 according to the second embodiment in the case where the problems in the fuel gas discharge valve 60 are caused by temporary factors are as described above. However, even in a case where the problems in the fuel gas discharge valve 60 are caused by problems in the valve body or actuator of the fuel gas discharge valve 60, at least an increase in the concentration of the fuel gas discharged to the outside of the fuel cell system 10 can be suppressed or prevented. In this case, the problems in the fuel gas discharge valve 60 are reported to an instrument panel.

In the second embodiment, in steps S210 and S212, the CPU 200 merely determines the flow rate of the diluent gas to be zero and to increase as the opening ratio increases, respectively. However, the CPU 200 may also determine the flow rate of the diluent gas regarding the flow rate of the oxidizing gas according to the operation state of the fuel cell FC and may set the total flow rate of the oxidizing gas to instruct the air compressor 30. For example, in a case where the flow rate of the oxidizing gas needed for the warm-up process is determined, as well as the flow rate of the diluent gas, the total flow rate of the oxidizing gas to be supplied by the air compressor 30 during the warm-up process can be determined.

In the second embodiment, the malfunction in closing the fuel gas discharge valve 60 is determined. However, the flow rate of the diluent gas may also be increased as the opening ratio increases without the determination of the malfunction in closing the valve. That is, the flow rate of the diluent gas may be determined depending on the opening ratio using an opening ratio of zero determined in a case where no leakage gas from the fuel gas discharge valve 60 is determined, and the concentration of the fuel gas in the oxidizing gas discharge pipe CL2 may be reduced. Even in this case, in a case where the opening ratio is extremely low, the absence of the leakage gas is determined, and the operation of the air compressor 30 can be suppressed.

The diluted gas flow rate determination process in the fuel cell system 10 according to the second embodiment may be executed during, as well as the execution of the sub-zero starting process, a process of discharging stored water in the vapor-liquid separator 42 executed during an operation of the fuel cell FC accompanied by the opening of the fuel gas discharge valve 60, or a process of discharging impurities in the fuel gas circulation path GCP of the fuel cell FC. During the execution of the discharging process described above, in a case where the environmental temperature outside the fuel cell system 10 is in a low-temperature environment, for example, at lower than zero degrees, freezing of the valve body in the fuel gas discharge valve 60 and incorporation of ice particles may occur. Therefore, by executing the diluted gas flow rate determination process, an increase in the concentration of the fuel gas in the oxidizing gas discharge pipe CL2 can be prevented or suppressed, or a reduction in the concentration of the fuel gas in the discharge oxidizing gas discharged from the oxidizing gas discharge pipe CL2 can be achieved.

In the second embodiment, the oxidizing gas bypass pipe CL3 may not be provided. Even in the case where the oxidizing gas bypass pipe CL3 is not provided, the determined flow rate of the diluent gas can be realized for the oxidizing gas discharge pipe CL2.

In the second embodiment, when the flow rate of the diluent gas is determined, the target fuel gas pressure in the warm-up process may be considered. That is, as the target fuel gas pressure decreases, the pressure in the fuel gas circulation path GCP decreases, and the pressure difference from the atmospheric pressure decreases. As a result, the flow rate of the leakage gas discharged from the fuel gas discharge valve 60 also decreases. Therefore, the flow rate of the diluent gas determined according to the opening ratio may be decreased as the target fuel gas pressure decreases. As a specific reduction method, for example, the relationship between the concentration of the fuel gas in the oxidizing gas discharge pipe CL2 and the target fuel gas pressure may be experimentally obtained in advance, a coefficient that decreases as the target fuel gas pressure decreases may be determined in advance, and the determined flow rate of the diluent gas may be multiplied by the coefficient.

Modification Example (1) First Modification Example

In the first and second embodiments, even when the oxidizing gas is supplied at the total oxidizing gas flow rate to which the determined diluent gas flow rate is added, in a case where the concentration of the fuel gas measured by the fuel gas concentration sensor 54 exceeds a predetermined reference concentration, the flow rate of the diluent gas may be increased. In a case where the use environment of the fuel cell system 10 needs a more strict fuel gas concentration in the exhaust oxidizing gas, or in a case where the flow rate of the leakage gas from the fuel gas discharge valve 60 is relatively high or the opening ratio of the fuel gas discharge valve 60 is relatively high and the concentration of the fuel gas outside the fuel cell system 10 exceeds the predetermined reference concentration, the flow rate of the diluent gas is further increased, thereby achieving suppression or prevention of an increase in the concentration of the fuel gas in the oxidizing gas discharge pipe CL2. In addition, a process of increasing the flow rate of the diluent gas based on the concentration of the fuel gas may be executed in an embodiment in which the flow rate of the diluent gas determined based on the flow rate of the leakage gas or the opening ratio is corrected, during the diluted gas flow rate determination process. In the case where the flow rate of the leakage gas from the fuel gas discharge valve 60 is relatively high, the concentration of the fuel gas measured by the fuel gas concentration sensor 54 may exceed the predetermined reference concentration even during the diluted gas flow rate determination process.

(2) Second Modification Example

In the second embodiment, the diluted gas flow rate determination process is executed during the execution period (A) of the warm-up pre-process. However, the warm-up pre-process may not be executed in the sub-zero starting process. In this case, the diluted gas flow rate determination process may be started at a timing at which the anode replacement process is ended.

While the disclosure has been described above based on the embodiments and modification examples, the embodiments of the present disclosure described above are for facilitating understanding of the disclosure and do not limit the disclosure. The disclosure can be modified and improved without departing from the spirit and the scope of the appended claims, and the equivalents thereof are included in the disclosure. For example, technical features in the embodiments and modification examples corresponding to the technical features in each of the aspects described in "SUMMARY" can be appropriately replaced or combined in order to solve a portion or the entirety of the problems described above, or accomplish a portion or the entirety of the effects described above. In addition, unless the technical features described above are described as essential in this specification, the technical features can be appropriately deleted.

What is claimed is:

1. A fuel cell system comprising:
    a fuel cell including an oxidizing gas supply portion, an oxidizing gas discharge portion, a fuel gas supply portion, and a fuel gas discharge portion;
    an oxidizing gas supplier configured to supply an oxidizing gas;
    an oxidizing gas supply pipe that connects the oxidizing gas supplier to the oxidizing gas supply portion;
    an oxidizing gas discharge pipe connected to the oxidizing gas discharge portion;
    a fuel gas supply pipe connected to the fuel gas supply portion;
    a fuel gas return pipe that connects the fuel gas discharge portion to the fuel gas supply pipe;
    a fuel gas discharge valve disposed between the fuel gas return pipe and the oxidizing gas discharge pipe, the fuel gas discharge valve being configured to discharge gas in the fuel gas return pipe to the oxidizing gas discharge pipe when the fuel gas discharge valve is opened; and a controller configured to:
execute a valve closing control to close the fuel gas discharge valve,
determine a flow rate of a diluent gas to be supplied to the oxidizing gas supply portion by the oxidizing gas supplier according to a flow rate of a leakage gas flowing from the fuel gas discharge valve to the oxidizing gas discharge pipe after the execution of the valve closing control, the flow rate of the diluent gas to be supplied to the oxidizing gas supply portion being determined to increase as the flow rate of the leakage gas increases, and
control the oxidizing gas supplier to supply the oxidizing gas at an adjusted flow rate of the oxidizing gas, wherein the adjusted flow rate of the oxidizing gas is a sum of the flow rate of the diluent gas and a flow rate of the oxidizing gas set according to an operation state of the fuel cell system.

2. The fuel cell system according to claim 1, wherein the controller is configured to determine the flow rate of the diluent gas according to the flow rate of the leakage gas in a case where the controller determines that the fuel gas discharge valve is in an opened state after the execution of the valve closing control based on the flow rate of the leakage gas.

3. A fuel cell system comprising:
a fuel cell including an oxidizing gas supply portion, an oxidizing gas discharge portion, a fuel gas supply portion, and a fuel gas discharge portion;
an oxidizing gas supplier configured to supply an oxidizing gas;
an oxidizing gas supply pipe that connects the oxidizing gas supplier to the oxidizing gas supply portion;
an oxidizing gas discharge pipe connected to the oxidizing gas discharge portion;
a fuel gas supply pipe connected to the fuel gas supply portion;
a fuel gas return pipe that connects the fuel gas discharge portion to the fuel pas supply pipe;
a fuel gas discharge valve disposed between the fuel gas return pipe and the oxidizing gas discharge pipe, the fuel gas discharge valve being configured to discharge gas in the fuel gas return pipe to the oxidizing pas discharge pipe when the fuel gas discharge valve is opened;
a pressure gauge that detects a pressure of a fuel gas in a fuel gas circulation path formed by a portion of the fuel gas supply pipe and the fuel gas return pipe; and
a controller configured to:
execute a valve closing control to close the fuel gas discharge valve,
determine a flow rate of a diluent gas to be supplied to the oxidizing pas supply portion by the oxidizing gas supplier according to a flow rate of a leakage gas flowing from the fuel gas discharge valve to the oxidizing gas discharge pipe after the execution of the valve closing control, the flow rate of the diluent gas to be supplied to the oxidizing gas supply portion being determined to increase as the flow rate of the leakage gas increases, wherein the controller is configured to determine the flow rate of the diluent gas according to the flow rate of the leakage gas in a case where the controller determines that the fuel gas discharge valve is in an opened state after the execution of the valve closing control based on the flow rate of the leakage gas,
obtain a ratio of a detection pressure value detected by the pressure gauge to a predetermined reference fuel gas pressure value, and
estimate that the flow rate of the leakage gas is higher as the ratio becomes lower.

4. The fuel cell system according to claim 3, wherein:
the controller is configured to execute, after the execution of the valve closing control and before execution of a warm-up process of the fuel cell, a warm-up pre-process of increasing the pressure of the fuel gas in the fuel gas circulation path and starting the fuel cell at a stoichiometric air-fuel ratio or at a fuel gas concentration richer than the stoichiometric air-fuel ratio; and
the controller is configured to determine the flow rate of the diluent gas during execution of the warm-up pre-process.

5. The fuel cell system according to claim 3, wherein:
the reference fuel gas pressure value is a pressure value of the fuel gas in the fuel gas circulation path when the fuel gas discharge valve is fully opened;
the controller is configured to calculate an opening ratio of the fuel gas discharge valve which is a ratio between a rate of change of the detection pressure value and a rate of change of the reference fuel gas pressure value in a predetermined period; and
the controller is configured to estimate that the flow rate of the leakage gas is higher as the opening ratio becomes higher.

6. The fuel cell system according to claim 5, wherein:
the controller is configured to execute, after the execution of the valve closing control and before execution of a warm-up operation of the fuel cell, a warm-up pre-process of increasing the pressure of the fuel gas in the fuel gas circulation path and starting the fuel cell at a stoichiometric air-fuel ratio or at a fuel gas concentration richer than the stoichiometric air-fuel ratio;
the predetermined period is an execution period of the warm-up pre-process; and
the controller is configured to determine that the fuel gas discharge valve is in a state of being unable to be closed, in a case where the rate of change of the detection pressure value is equal to or higher than a valve closing inability determination threshold.

7. The fuel cell system according to claim 1, wherein the controller is configured to determine the flow rate of the diluent gas to decrease as a target fuel gas pressure during a warm-up process of the fuel cell decreases.

8. The fuel cell system according to claim 1, further comprising:
an oxidizing gas bypass pipe that bypasses the fuel cell and allows the oxidizing gas supply pipe and the oxidizing gas discharge pipe to communicate with each other; and
a diverter valve disposed in the oxidizing gas bypass pipe, the diverter valve being configured to divert a flow of the oxidizing gas into a first flow flowing toward the oxidizing gas supply portion and a second flow flowing toward the oxidizing gas discharge pipe at an arbitrary ratio,
wherein the controller is configured to control the diverter valve to have a valve opening degree to decrease a flow ratio of the second flow to the first flow when the controller controls the oxidizing gas supplier to supply the oxidizing gas at the flow rate of the diluent gas.

9. The fuel cell system according to claim 1, further comprising
 a fuel gas concentration detector that measures a concentration of the fuel gas outside the fuel cell,
 wherein in a case where the concentration of the fuel gas measured by the fuel gas concentration detector is higher than a determination threshold, the controller is configured to control the oxidizing gas supplier to increase the flow rate of the diluent gas to be higher than the flow rate of the diluent gas in a case where the fuel gas concentration is equal to or lower than the determination threshold.

10. The fuel cell system according to claim 1, wherein the controller is configured to control the oxidizing gas supplier to supply the oxidizing gas at the flow rate of the diluent gas during a warm-up process of the fuel cell.

* * * * *